United States Patent [19]

Thomson et al.

[11] 4,246,979
[45] Jan. 27, 1981

[54] INTERNAL SLEEVE AIR RELEASE CONTROL APPARATUS IN SEISMIC AIR GUN

[75] Inventors: John T. Thomson, Dallas; Roy C. Johnston, Richardson, both of Tex.

[73] Assignee: Texas Instruments Incorporated, Dallas, Tex.

[21] Appl. No.: 27,198

[22] Filed: Apr. 5, 1979

[51] Int. Cl.³ .................. G01V 1/137; G01V 1/387
[52] U.S. Cl. .................. 181/120; 181/115; 367/144
[58] Field of Search .................. 181/115, 118, 120; 367/144

[56] References Cited

U.S. PATENT DOCUMENTS

| | | | |
|---|---|---|---|
| 3,653,460 | 4/1972 | Chelminski | 181/120 |
| 4,114,723 | 9/1978 | Paitson et al. | 181/120 |
| 4,180,139 | 12/1979 | Walker | 181/120 |

*Primary Examiner*—Howard A. Birmiel
*Attorney, Agent, or Firm*—Thomas G. Devine; Leo N. Heiting; Melvin S. Sharp

[57] ABSTRACT

Disclosed is a seismic source device, known in the industry as an air gun, having internal sleeve and shuttle control for allowing a predetermined discharge of compressed air into water for purposes of seismic exploration. The shuttle engages an internal sleeve having ports that momentarily align with exhaust ports and then moves past, sealing off the exhaust ports before all of the compressed air in the firing chamber of the air gun is exhausted. By preventing further discharge of air with little or no loss in acoustic output, pulses are greatly reduced, thereby enhancing the operation of the entire system. Further by preventing all the air in the firing chamber from being discharged, the system becomes more efficient and more cost effective.

4 Claims, 4 Drawing Figures

INTERNAL SLEEVE AIR RELEASE CONTROL APPARATUS IN SEISMIC AIR GUN

BACKGROUND OF THE INVENTION

This invention relates to seismic source devices and more particularly to a shuttle controlled seismic source device which allows only a portion of the air found in the firing chamber of the device from being discharged into the surrounding environment.

In marine seismic exploration, a source of acoustic energy is released into the water every few seconds to obtain appropriate acoustic waves that propagate into the earth's surface. These waves are reflected at interfaces of the subsurface formations and propagated back to instruments where transducers convert the acoustic waves to electronic signals which are recorded and later processed into a record section for interpretation of the subsurface formations. Marine seismic exploration is of two types, the first type being on water where the seismic source units are strung or towed from a water vehicle. The second type of marine seismic exploration is arctic marine exploration where the seismic source units are disposed below an ice layer to determine the formation of the rock surfaces below the ice layer.

During the past decade, the major marine seismic energy source for both types of marine exploration has been the air gun. An air gun, as in the prior art, releases high-pressure air (typically 2000 PSI up to 6000 PSI or even more) into the water to create the desired acoustic wave.

State of the art air guns normally comprise an annular housing that contains means for discharging compressed air through exhaust ports in the housing. Compressed air is stored within the housing in a firing chamber. The only moving component (except for the solenoid triggering device) in the state of the art air guns is a shuttle, which when raised, permits air to escape from the firing chamber through the exhaust ports in the main housing into the surrounding water. The size of the gun is determined by the firing chamber volume selected. By having a constant source of compressed air through an inlet passage in the housing, the upper chamber containing the shuttle is filled and forces the shuttle into a sealed position closing off all exhaust ports from the firing chamber. By using a solenoid valve to allow air flow underneath the shuttle flange thus forcing the shuttle upward and causing an unequal pressuring on the shuttle pistons opposing each other on the shuttle shaft, the shuttle is accelerated in the upward direction exposing the chamber exhaust ports and allowing compressed air to escape into the surrounding water. When the shuttle is in the down, or closed position, the air gun is charged and ready for firing. When fired, the state of the art air gun allows 80-90% of the air in the firing chamber to be exhausted into the water. Consequently, prior art air guns suffer two major disadvantages: first, the efficiency of the air gun for converting stored energy to useful acoustic energy in the seismic passband is well below 10%, and second, the undesirable secondary pressure pulses follow the first acoustic pulse and obscure or confuse the time of the reflected signals.

Several approaches have been taken by the industry to overcome this second disadvantage of undesirable secondary pressure pulses. However, it has been found that the solutions provided are either the cause for a less efficient system of converting stored to acoustic energy or result in greater expense in processing the data. Among the methods presently employed to reduce secondary pulse amplitudes are those that include throttling additional air into the bubble as it forms outside the chamber with a so-called "wave shaping kit", using an array of guns of different sizes, and thus different bubble pulse periods, to destructively reduce the secondary pulses and finally, "signature correction" techniques in data processing to reduce the secondary pulses recorded. "Signature" may be defined as the recorded wavelet or pressure level of the acoustic pressure discharged into the water over a fixed period of time.

Copending U.S. Pat. application, Ser. No. 929,883, entitled "Air Release Control in Seismic Energy Source Air Gun", filed July 31, 1978, and assigned to the assignee of this invention, teaches, as a preferred embodiment, an air gun incorporating a secondary shuttle which is activated at the proper moment to cause the closure, by a primary shuttle, of the exhaust ports to further discharge of air from within the air gun.

The present invention utilizes an internal sleeve having ports therethrough, activated by the shuttle to permit the escape of compressed air when the exhaust ports communicate with the sleeve ports, and closing off the flow of air, through the exhaust ports, from within the body of the air gun when the sleeve ports move above the exhaust ports. The shuttle reverses direction, moving the sleeve with it to its charged position.

SUMMARY OF THE INVENTION

In accordance with the present invention, a seismic source device is provided having a housing with a provision for an inner chamber for storing compressed air. A first section of the housing has, as in the prior art, two air inlets for providing compressed air passage to the inner chamber. Further, in the first section of the housing, a shuttle unit is provided for causing the sealing off of exhaust ports formed in the housing, thus preventing compressed air from exhausting through these ports. The shuttle found in the first section of the housing is actuated by a solenoid valve element which allows air to force the shuttle in an upward direction, releasing compressed air from the inner chamber.

By placing a moveable sleeve having ports in the housing, the exhaust ports may be closed relatively soon after the initial discharge, thus preventing complete exhaustion of the inner chamber and making the seismic exploration more cost effective, efficient, and reducing undesirable secondary pulses in the acoustic signal. When the shuttle is forced in an upward direction, it contacts the sleeve and forces it upward as well. When ports in the sleeve communicate with the exhaust ports, high pressure air is discharged. At the instant of maximum discharged pressure level, the sleeve ports move up past the exhaust ports and prevent further discharge of the air found at the greatest pressure in the inner chamber from escaping, and thus allow the compressed air coming in from the air inlets to force the shuttle downward, moving the sleeve downward to the charge position.

BRIEF DESCRIPTION OF THE DRAWINGS

For a more complete understanding of the present invention, reference may now be made to the following description taken in conjunction with the accompanying drawings in which.

DETAILED DESCRIPTION OF THE DRAWINGS

Figure 1C:
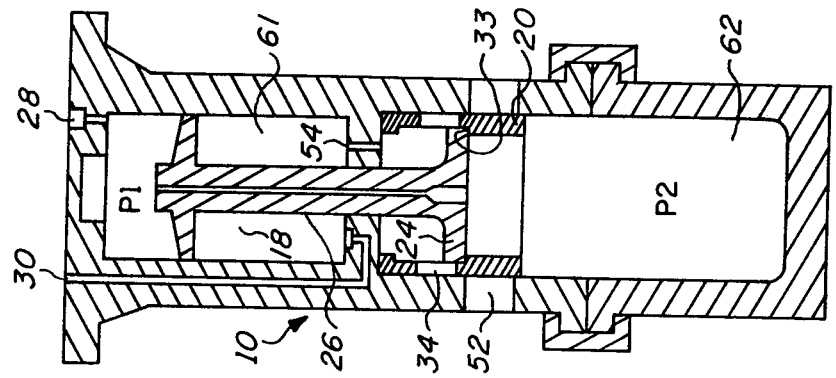
FIGS. 1a, 1b, 1c are a complete cross sectional view of a seismic source unit, shown in the charge, fire and reset positions in accordance with the present invention.

Referring now to the figures and more specifically to FIG. 1 a seismic source unit displaying shuttle control is illustrated. The seismic source unit 10 comprises a housing 12 that may be sectionalized into a first housing 14 and second housing 16. In the prior art, the second housing 16 contained either an empty chamber for storing compressed air or a fixed, divided chamber otherwise known as the firing chamber. The seismic source unit of the present invention, utilizing shuttle control, has a shuttle 18 in a first housing 14, and a moveable sleeve 20 that operates in first housing 14 and in a second housing 16. The shuttle 18 has opposing annular pistons 22 and 24 connected by a shaft 26. The sleeve 20 has ports 34 formed therethrough. The shuttle 18 and sleeve 20 are sliding devices.

The first housing 14 containing shuttle 18 provides two air inlet passages 28 and 30. Inlet passage 28 provides compressed air to the inner chamber of housings 14 and 16. Inlet passage 30 is further connected to a solenoid valve, not shown, which actuates the shuttle 18 as described hereinafter.

Shuttle 18 further provides an orifice 32 found in the center of shaft 26.

The inner chamber of the seismic air unit 10 may be divided into the air chambers such as those found in FIG. 1 labeled 61 and 62. The sliding shuttle 18 is disposed within chamber 14 such that the annular piston 22 is capable of seating against cross member structure 36. The lower surface of piston 24 engages surface 35 of sleeve 20 when the shuttle 18 moves upwardly. Shuttle 18 has its shaft 26 sliding through a cutout in cross member 36.

Since the volumetric size of the chamber determines the size or firing power of the seismic source unit, variable housing sizes may be used for the second housing 16. Providing clamps 50 to hold the first and second housings 14 and 16 together allows for the use of a variable size firing chamber or second housing 16. Also, to effectively discharge an acoustic signal into the water as a result of forcing air out of the seismic source unit 10, a plurality of discharge or exhaust ports 52 are provided.

Figure 1B:
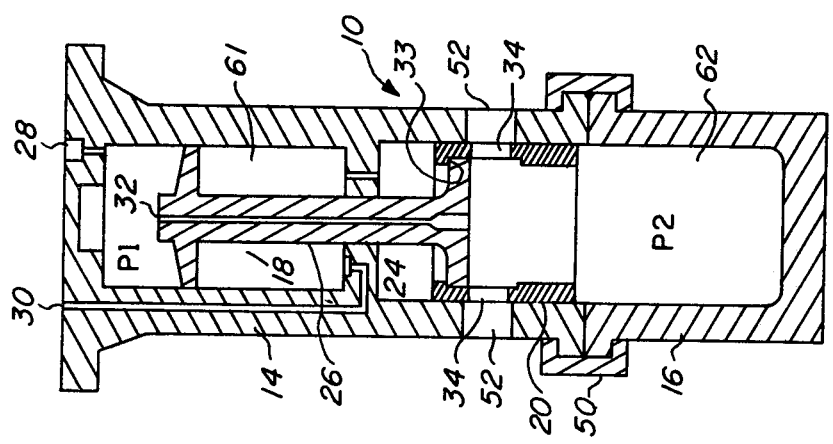
Figure 1A:
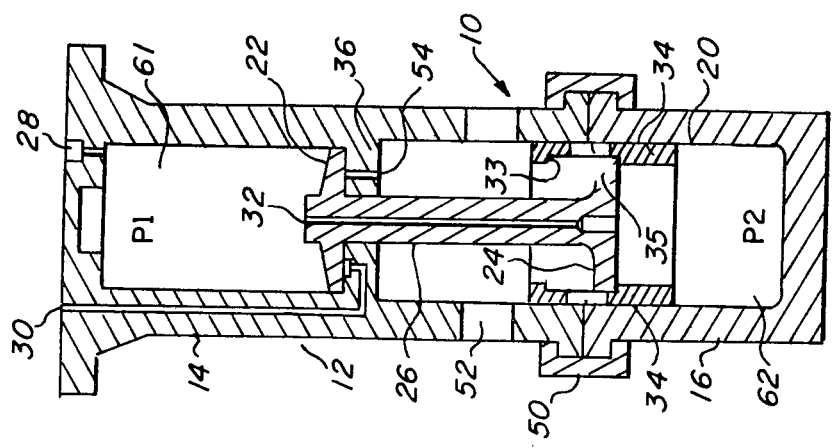
Figure 2:
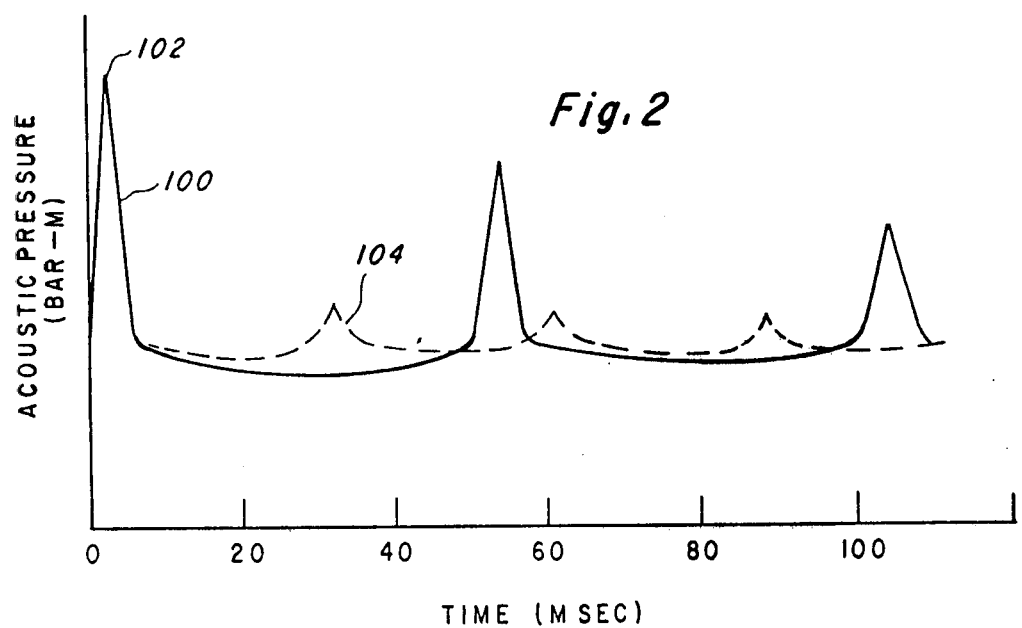
FIG. 2 is a graphical representation of an acoustic pulse signal.

In describing the operation of the seismic source unit 10 found in FIG. 1, it is necessary to refer to FIGS. 1a–1c and 2, with FIG. 2 illustrating an acoustic pulse signal as a function of time. In the prior art, upon the firing of a seismic source unit, a shuttle similar to the shuttle 18 illustrated in FIG. 1 is forced by use of an actuating means, such as a solenoid element, to force the shuttle upward, thereby moving piston 24 away from an annular support member, releasing the compressed air found in the lower firing chamber. This action results in an acoustic pulse signal similar to the signal found in FIG. 3 represented by the solid line 100. As can be seen from the graph, the peak output pressure level 102 is reached in a very short time, e.g., 1.3 m sec, for a chamber size of 40 cu. in. at pressure P2 of 2000 psi and continuing the firing cycle, i.e., keeping the shuttle in the upward position and allowing further air to escape, results in wasted energy and further causes unwanted oscillating bubbles in the water media which result in secondary acoustic pressure pulses which generally distract from the primary pressure pulse for recording purposes.

In accordance with the present invention utilizing internal sleeve and shuttle control, the unit reduces the firing cycle by effectively closing off the exhaust ports before all the compressed air is discharged from the firing chamber and saves compressed air, i.e., energy, and further reduces secondary pulses, thereby enhancing the value of the recorded primary acoustic pulse. A representation of such an acoustic signal from the present invention is the dotted line 104 in FIG 3. Here the secondary pulses are reduced and do not interfere with the primary pulse.

Operationally, the seismic unit 10 is provided with compressed air from the source of supply through air inlet 28. This compressed air fills chamber 61 prior to filling chamber 62. As the pressure rises in chamber 61, air is further forced into chamber 62 through orifice 32. Upon being fully charged, and in equilibrium, pressures P1 and P2 are equal.

As compressed air is forced through inlet 28 prior to reaching this equilibrium condition, the shuttle 18 is forced into a downward position where its annular piston 22 seats onto edge 35 of sleeve 20, forcing it into a downward position. While the seismic source unit 10 is in the equilibrium condition or firing condition, the discharge ports 52 are blocked from the compressed air in chamber 62 by the shuttle 18 and sleeve 22, thus preventing any compressed air from being discharged into the surrounding water.

To fire the seismic source unit, i.e., discharge or exhaust compressed air into the surrounding water, it is necessary to actuate the shuttle 18. This may be accomplished by use of a solenoid valve, not shown in FIG. 1, whereby compressed air is forced under annular piston 22 through inlet 30, thus releasing the shuttle 18's seating forces and explosively accelerating it upward so that sleeve ports 34 communicate with exhaust ports 52 as shown in FIG. 2b, firing an acoustic burst of energy into the surrounding water. The upper surface of pistor 24 of shuttle 18 had contacted edge 33 of sleeve 20, causing upward motion of sleeve 20. The shuttle 18 and sleeve 20 continue in an upward direction, terminating such motion when sleeve 20 contacts member 36 as indicated in FIG. 1c. At this point, pressure P2 in chamber 62 has decreased substantially because of the firing, and the pressure P1 in chamber 61 rises. Shuttle 18 moves downwardly, as indicated in FIG. 1c, the surface of piston 24 contacting edge 35 of sleeve 20, causing a downward motion of sleeve 20 as well. Piston 24 seals off exhaust ports 52 on the downward stroke. Shuttle 18 and sleeve 20 terminate this motion as indicated in FIG. 1a, the charged position.

While the invention has been described and illustrated with respect to a specific embodiment, it is understood that changes or modifications can be made without departing from the spirit and scope of the invention described herein.

What is claimed is:

1. A seismic energy source apparatus having a housing defining at least one exhaust port and an inner chamber for storing compressed air and containing a shuttle having first and second pistons disposed generally parallel to each other at opposite ends of a shaft with an orifice therethrough, having a first air supply means for providing compressed air to the chamber and having a second air supply means controlled by actuating means for supplying air pressure under the first piston to cause the shuttle to move upwardly to suddenly release the compressed air from the chamber through the exhaust port, and having an internal sliding valve, the valve comprising:

(a) a sleeve body, having at least one port therethrough for communication with the exhaust port;
(b) a lower contacting surface, integral with the body, adapted to be contacted by the lower surface of the second piston to effect downward motion; and
(c) an upper contacting surface, integral with the body, adapted to be contacted by the upper surface of the second piston to effect upward motion to move the sleeve port past the exhaust port, blocking further release of the compressed air at the instant of maximum discharge pressure.

2. The apparatus of claim 1 wherein the upper contacting surface comprises an annular member.

3. The apparatus of claim 1 wherein the lower contacting surface comprises an annular member.

4. The apparatus of claim 2 wherein the lower contacting surface comprises an annular member.

* * * * *